US012686246B2

(12) United States Patent
Nedumaran et al.

(10) Patent No.: US 12,686,246 B2
(45) Date of Patent: Jul. 21, 2026

(54) SYSTEM AND METHOD FOR REGULATING ENVIRONMENT WITHIN OPERATOR CABIN OF MACHINE

(71) Applicant: Caterpillar Inc., Peoria, IL (US)

(72) Inventors: Elakhya Nedumaran, Chennai (IN); Liang Fan, Wuxi (CN); Jiawei Sheng, Wuxi (CN); Tao Meng, Wuxi (CN); Bahman Gozloo, Peoria, IL (US); Dennis Lee Kroeger, Washington, IL (US); Weixiu Wang, Wuxi (CN); Yosabath Samraj M, Sholinganallur (IN); Thanjavur Nagarajan Sriraam, Thanjavur (IN)

(73) Assignee: Caterpillar Inc., Peoria, IL (US)

( * ) Notice: Subject to any disclaimer, the term of this patent is extended or adjusted under 35 U.S.C. 154(b) by 911 days.

(21) Appl. No.: 18/050,165

(22) Filed: Oct. 27, 2022

(65) Prior Publication Data

US 2024/0140168 A1 May 2, 2024

(51) Int. Cl.
*B60H 1/00* (2006.01)
*B60H 3/06* (2006.01)

(52) U.S. Cl.
CPC ......... *B60H 1/008* (2013.01); *B60H 1/00378* (2013.01); *B60H 1/00814* (2013.01); *B60H 3/0608* (2013.01)

(58) Field of Classification Search
CPC ... B60H 1/008; B60H 1/00378; B60H 3/0608
See application file for complete search history.

(56) References Cited

U.S. PATENT DOCUMENTS

| | | | |
|---|---|---|---|
| 10,352,084 B2 | 7/2019 | Hovel et al. | |
| 10,850,222 B2 * | 12/2020 | Moredock | B60H 3/0608 |
| 2013/0324024 A1 | 12/2013 | Remmers et al. | |
| 2015/0251521 A1 * | 9/2015 | Brauer | B60H 1/3208 62/133 |
| 2019/0017312 A1 * | 1/2019 | Hovel | E05F 15/72 |
| 2020/0031205 A1 * | 1/2020 | Johnstone | B60H 1/246 |

FOREIGN PATENT DOCUMENTS

| | | |
|---|---|---|
| CN | 110514244 | 11/2019 |
| CN | 109624645 | 12/2021 |
| JP | 2008201224 | 9/2008 |
| KR | 101491243 | 2/2015 |
| WO | 2022115920 | 6/2022 |

* cited by examiner

*Primary Examiner* — Allen R. B. Schult

(57) ABSTRACT

A system for regulating an environment within an operator cabin of a machine via a heating, ventilation, and air conditioning (HVAC) system includes a first sensor that generates a first signal of an amount of air pressure within the operator cabin, a second sensor that generates a second signal of an amount of carbon dioxide within the operator cabin, an air filtration element to direct pre-cleaned air into the operator cabin, an inlet valve disposed between the air filtration element and the HVAC system for controlling a flowrate of the pre-cleaned air to the HVAC system, and a controller. The controller actuates dynamic auto-control of the inlet valve to direct an optimally varying flowrate of the pre-cleaned air from the air filtration element to the HVAC system via the inlet valve to maximize a service life of the air filtration element.

20 Claims, 3 Drawing Sheets

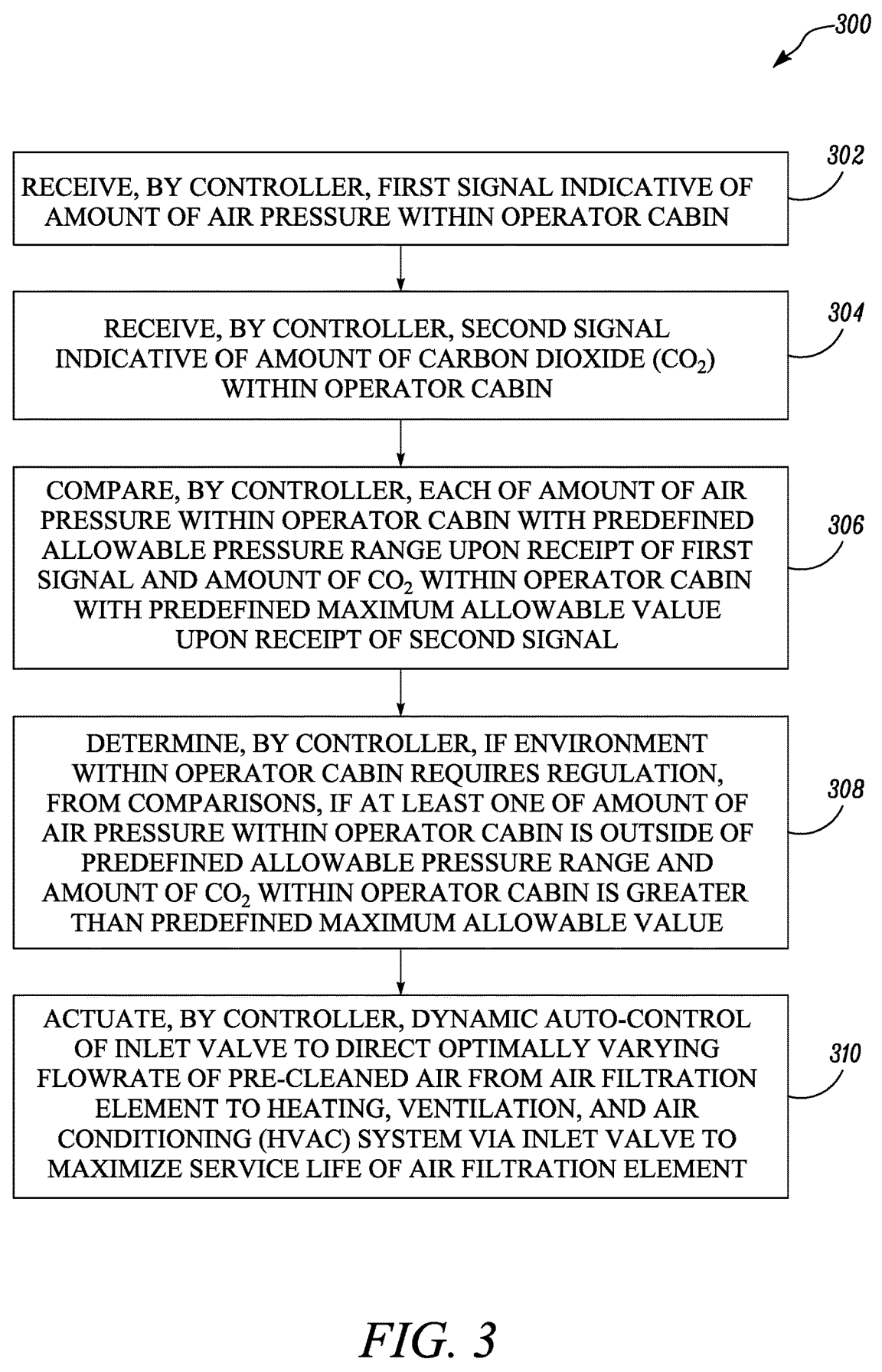

*300*

| 302 |
|---|
| RECEIVE, BY CONTROLLER, FIRST SIGNAL INDICATIVE OF AMOUNT OF AIR PRESSURE WITHIN OPERATOR CABIN |

| 304 |
|---|
| RECEIVE, BY CONTROLLER, SECOND SIGNAL INDICATIVE OF AMOUNT OF CARBON DIOXIDE ($CO_2$) WITHIN OPERATOR CABIN |

| 306 |
|---|
| COMPARE, BY CONTROLLER, EACH OF AMOUNT OF AIR PRESSURE WITHIN OPERATOR CABIN WITH PREDEFINED ALLOWABLE PRESSURE RANGE UPON RECEIPT OF FIRST SIGNAL AND AMOUNT OF $CO_2$ WITHIN OPERATOR CABIN WITH PREDEFINED MAXIMUM ALLOWABLE VALUE UPON RECEIPT OF SECOND SIGNAL |

| 308 |
|---|
| DETERMINE, BY CONTROLLER, IF ENVIRONMENT WITHIN OPERATOR CABIN REQUIRES REGULATION, FROM COMPARISONS, IF AT LEAST ONE OF AMOUNT OF AIR PRESSURE WITHIN OPERATOR CABIN IS OUTSIDE OF PREDEFINED ALLOWABLE PRESSURE RANGE AND AMOUNT OF $CO_2$ WITHIN OPERATOR CABIN IS GREATER THAN PREDEFINED MAXIMUM ALLOWABLE VALUE |

| 310 |
|---|
| ACTUATE, BY CONTROLLER, DYNAMIC AUTO-CONTROL OF INLET VALVE TO DIRECT OPTIMALLY VARYING FLOWRATE OF PRE-CLEANED AIR FROM AIR FILTRATION ELEMENT TO HEATING, VENTILATION, AND AIR CONDITIONING (HVAC) SYSTEM VIA INLET VALVE TO MAXIMIZE SERVICE LIFE OF AIR FILTRATION ELEMENT |

*FIG. 3*

SYSTEM AND METHOD FOR REGULATING ENVIRONMENT WITHIN OPERATOR CABIN OF MACHINE

TECHNICAL FIELD

The present disclosure relates to an operator cabin of a machine. More particularly, the present disclosure relates to a system and method for regulating an environment within the operator cabin of the machine.

BACKGROUND

Machines, such as construction machines or mining machines, may be designed to execute various earthmoving operations at worksites. Such machines typically include an operator cabin wherein, or from within which, an operator may control the machine for performing one or more earthmoving operations. The worksites at which these machines are operated may comprise contaminants, such as, harmful nanoparticles, respirable particulates, and/or other airborne contaminants. Moreover, a heating, ventilation, and air conditioning (HVAC) system may be employed by the machine to supply clean and heated/cooled air to the operator cabin. Accordingly, ambient air from an outside environment may require filtration so that ambient air is cleaned of harmful and/or undesired contaminants and such cleaned air is then let into the operator cabin. In this manner, it is envisioned that the cleaned air would prevent, or at least minimize, the operator's exposure to harmful contaminants. Typically, a filter is positioned before the HVAC system to clean/filter ambient air. The filter performs cleaning of ambient air for filtering out contaminants therefrom. Further, the now cleaned air is directed towards the operator cabin.

Current regulatory standards mandate that air pressure and carbon dioxide ($CO_2$) within the operator cabin should be maintained within prescribed limits in order to provide a safe, or at least protective, and comfortable working environment for the operator within the operator cabin. More particularly, maintenance of air pressure and $CO_2$ levels within the operator cabin may be required as unprescribed air pressure or $CO_2$ levels (i.e., air pressure or amount of $CO_2$ within the operator cabin is out of the prescribed limits) may cause discomfort to the operator and may also affect a health of the operator. Typically, the machines include systems that may maintain one or more parameters (such as, air pressure and/or $CO_2$) in the operator cabin within the prescribed limits.

Conventional systems control one or more components of the machine, such as, an air vent in the operator cabin to maintain the parameters, such as, air pressure and/or $CO_2$ within the prescribed limits. For example, PCT Publication No. WO 2022/115920, hereinafter referred to as '920 Publication, describes a system and a method for monitoring an environment of a cabin including an air pressurization system, a filtration means, at least one air pressure sensor, a vent, and control means. The air pressurization system continuously supplies pressurized air to the filtration means at a constant flowrate. The pressurized air is ultimately delivered to the cabin. The control means determines air pressure of the cabin by way of the at least one air pressure sensor and compares the current air pressure level against a desired air pressure level to obtain a first comparative value. The control means thereafter is operable to control the state of the vent in response to at least the first comparative value. Thus, the '920 Publication teaches variation in air pressure of the cabin by controlling a state/position of the vent that is present within the cabin. For example, the control means may increase an opening of the vent to depressurize the cabin.

SUMMARY OF THE DISCLOSURE

In an aspect of the present disclosure, a system for regulating an environment within an operator cabin of a machine via a heating, ventilation, and air conditioning (HVAC) system of the operator cabin is provided. The system includes a first sensor configured to generate a first signal indicative of an amount of air pressure within the operator cabin. The system also includes a second sensor configured to generate a second signal indicative of an amount of carbon dioxide ($CO_2$) within the operator cabin. The system further includes an air filtration element to direct pre-cleaned air into the operator cabin. The system includes an inlet valve disposed between the air filtration element and the HVAC system. The inlet valve is configured to control a flowrate of the pre-cleaned air to the HVAC system. The system also includes a controller coupled in communication with the first sensor, the second sensor, and the inlet valve. The controller is configured to receive the first signal indicative of the amount of air pressure within the operator cabin from the first sensor. The controller is also configured to receive the second signal indicative of the amount of $CO_2$ within the operator cabin from the second sensor. The controller is further configured to compare each of the amount of air pressure within the operator cabin with a predefined allowable pressure range upon receipt of the first signal and the amount of $CO_2$ within the operator cabin with a predefined maximum allowable value upon receipt of the second signal. The controller is configured to determine if the environment within the operator cabin requires regulation, from the comparisons, if at least one of the amount of air pressure within the operator cabin is outside of the predefined allowable pressure range and the amount of $CO_2$ within the operator cabin is greater than the predefined maximum allowable value. The controller is also configured to actuate dynamic auto-control of the inlet valve to direct an optimally varying flowrate of the pre-cleaned air from the air filtration element to the HVAC system via the inlet valve to maximize a service life of the air filtration element.

In another aspect of the present disclosure, a machine is provided. The machine includes an operator cabin. The machine also includes a heating, ventilation, and air conditioning (HVAC) system associated with the operator cabin. The machine further includes the system provided above for regulating the environment within the operator cabin via the HVAC system.

In yet another aspect of the present disclosure, a method for regulating an environment within an operator cabin of a machine via a heating, ventilation, and air conditioning (HVAC) system of the operator cabin is provided. The method includes receiving, by a controller, a first signal indicative of an amount of air pressure within the operator cabin. The method also includes receiving, by the controller, a second signal indicative of an amount of carbon dioxide ($CO_2$) within the operator cabin. The method further includes comparing, by the controller, each of the amount of air pressure within the operator cabin with a predefined allowable pressure range upon receipt of the first signal and the amount of $CO_2$ within the operator cabin with a predefined maximum allowable value upon receipt of the second signal. The method includes determining, by the controller, if the environment within the operator cabin requires regulation, from the comparisons, if at least one of the amount of air pressure within the operator cabin is outside of the predefined allowable pressure range and the amount of $CO_2$ within the operator cabin is greater than the predefined maximum allowable value. The method also includes actuating, by the controller, dynamic auto-control of the inlet valve to direct an optimally varying flowrate of the pre-cleaned air from the air filtration element to the HVAC system via the inlet valve to maximize a service life of the air filtration element.

Other features and aspects of this disclosure will be apparent from the following description and the accompanying drawings.

BRIEF DESCRIPTION OF THE DRAWINGS

FIG. 3 is a flowchart of a method for regulating the environment within the operator cabin of the machine, according to an exemplary embodiment of the present disclosure.

DETAILED DESCRIPTION

Figure 1:
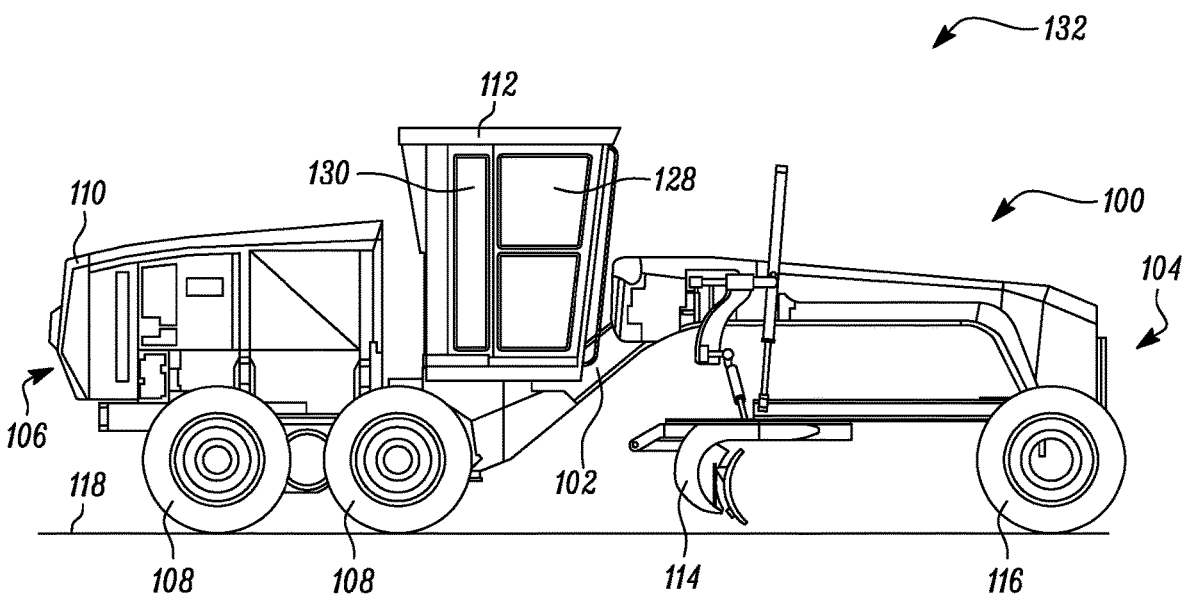
FIG. 1 is a diagrammatic representation of a side view of a machine, according to an exemplary embodiment of the present disclosure.

Wherever possible, the same reference numbers will be used throughout the drawings to refer to the same or like parts. Referring to FIG. 1, a side view of an exemplary machine 100 is illustrated. As shown in FIG. 1, the machine 100 is embodied as a motor grader. The machine 100, when embodied as the motor grader as depicted, may operate on a ground surface 118 to flatten uneven surfaces, such as, during a grading process prior to road construction, to cut/dig the ground surface 118, and/or for moving of snow/debris, without any limitations. Although the motor grader is depicted herein, the present disclosure is not limited to any particular type of machine. As such, the machine 100 may include, but is not limited to, a loader, a pavers, a compactor, and a truck. In alternative configurations, the machine 100 may embody any construction machine or mining machine that may operate at various types of worksites, for example, on-ground worksites such as that encountered in cases of surface level construction sites, and surface level mines, or below ground worksites, as would be encountered in underground mines. In yet other configurations, the machine 100 may be alternatively configured to operate above-ground. An example of such an above-ground machine such as, a tower crane used in picking and placing one or more objects on a surface-level construction site and having a cabin rotatable about a vertical axis (not shown).

The machine 100 includes a frame 102. The frame 102 defines a front end 104 and a rear end 106. Further, the machine 100 includes two pairs of rear wheels 108 disposed proximate to the rear end 106 and one pair of front wheels 116 disposed proximate to the front end 104. The front wheels 116 and the rear wheels 108 allow movement of the machine 100 on the ground surface 118. The frame 102 supports various components of the machine 100 including, but not limited to, a power source (not shown) disposed within an enclosure 110, the front wheels 116, and the rear wheels 108. The power source may be an engine, such as an internal combustion engine, and/or an electric source of power. The engine may include one of a gasoline engine, a diesel engine, or a natural gas engine. The power source may power various components of the machine 100 for operation thereof.

Further, the machine 100 includes an operator cabin 112 (hereinafter referred to as "cabin" and denoted using identical numeral "112"). The cabin 112 provides an operator of the machine 100 with a regulated environment so that such regulated environment can render the cabin 112 safe, or at least protective, and consequently facilitate the operator to effectively control and operate the machine 100 from within the cabin 112. The cabin 112 may include a pair of doors 128 (only one of which is illustrated herein) for the operator to enter and exit the cabin 112. Further, the cabin 112 includes one or more windows 130 (only one of which is illustrated herein). In an example, the windows 130 may allow the operator to view an ongoing earthmoving operation.

Further, the cabin 112 may include one or more sealing elements that may seal the cabin 112 from a surrounding 132 of the machine 100 for preventing leakage of air from the cabin 112 or for preventing ingress of air into the cabin 112. The sealing elements may be made from rubbers or polymers that may prevent leakage therethrough. The sealing elements may be disposed at all interfaces between the inside of the cabin 112 and the surrounding 132, such as, along the doors 128, the windows 130, or any other vents/openings in the cabin 112. The cabin 112 may further include an operator seat (not illustrated), a steering control (also not illustrated), and various other components and equipment for controlling movement and/or operation by the machine 100.

Further, an input device 120 (schematically shown in FIG. 2) may be disposed in the cabin 112. The input device 120 may be used by the operator to generate various input commands for operating the machine 100. The input device 120 may include physical input devices, such as, buttons, switches, knobs, and joysticks. Additionally, or optionally, the input device 120 may include virtual input devices such as, but not limited to, icons displayed on a touch screen.

Further, a display device 122 (schematically shown in FIG. 2) may be disposed in the cabin 112. The display device 122 may be used to convey information or notifications to the operator. The display device 122 may include an electroluminescent display, a liquid crystal display (LCD), a light-emitting diode (LED) display, or a thin-film transistor (TFT). The display device 122 may include a portable device, such as, a tablet or a smartphone. The display device 122 may generate various visual notifications as well have suitable hardware, for example, electro-acoustic transducers, or speakers, to render audio notifications. The visual notifications may include text messages and/or graphical illustrations including visual prompts, but not limited thereto. Further, the audio notifications may include audible messages, or sounds (such as a buzzing sound).

Moreover, an alarm 124 (schematically shown in FIG. 2) is disposed within the cabin 112. The alarm 124 may include any device that attracts the operator's attention so as to notify the operator of an event of relevance. The alarm 124 may provide audible notifications. The alarm 124 may generate a sound (such as, a buzzer) to alert the operator of any incident associated with the machine 100. The alarm 124 may also flash a light to attract the operator's attention. Further, the alarm 124 may also include a beacon. In an example, the alarm 124 may be a part of the display device 122 itself.

In one example, the input device 120, the display device 122, and the alarm 124 may be embodied as separate stand-alone devices. In another example, the input device 120, the display device 122, and the alarm 124 may form part of a single device, such as, a user interface. For example, functionalities of the input device 120, the display device 122, and the alarm 124 may be incorporated into the user interface. In such examples, the input device 120 may include a keyboard, a touch screen, or any other means that may allow the operator to generate input commands. Further, the display device 122 may be embodied as a display screen of the user interface.

Figure 2:
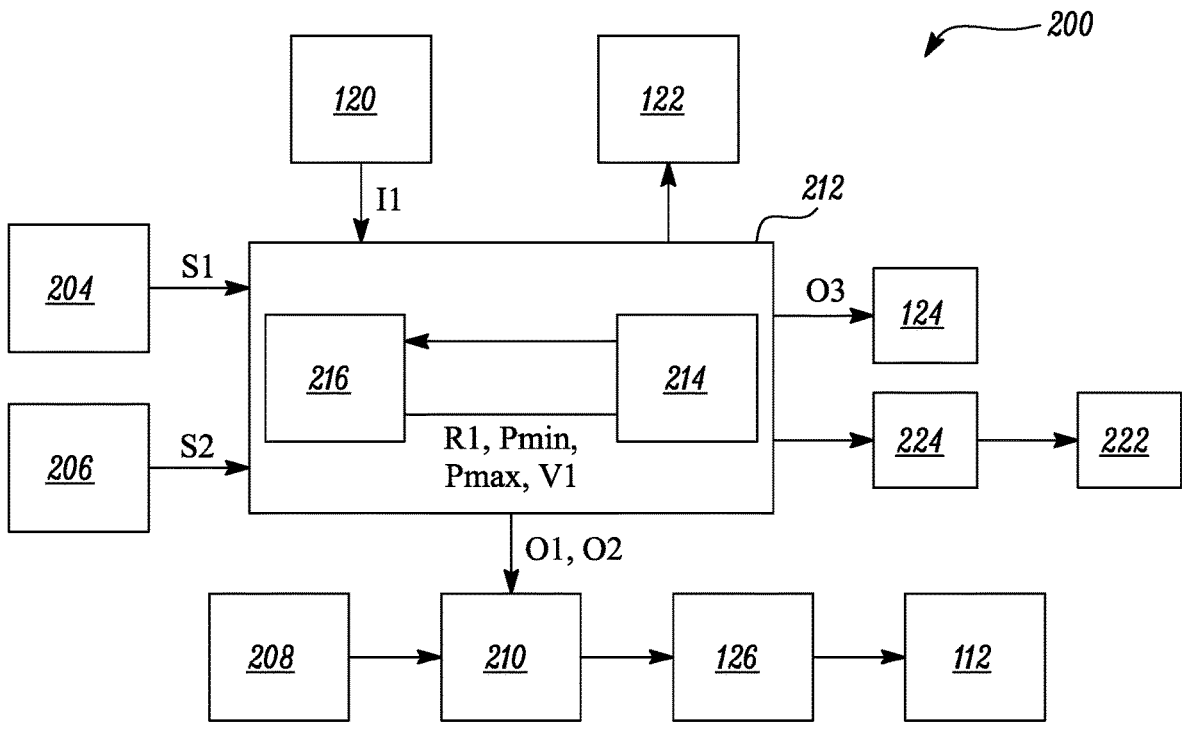
FIG. 2 is a schematic of a system for regulating an environment within an operator cabin of the machine, according to an exemplary embodiment of the present disclosure.

When the machine 100 is operating at the worksite, an environment within the cabin 112 may have to be actively regulated to maintain air quality within the cabin 112 and to prevent, or at least, minimize exposure for the operator to contaminants present in ambient air that enters the cabin 112 from the surrounding 132 of the machine 100. Further, the machine 100 includes a heating, ventilation, and air conditioning (HVAC) system 126, as schematically shown in FIG. 2. The HVAC system 126 may be used to operatively maintain temperature, pressure, or humidity within the cabin 112 of the machine 100. The HVAC system 126 may include various components to direct a flow of cleaned and heated/cooled air towards, and into, the cabin 112. The HVAC system 126 may include components, such as, an evaporator, a compressor, a condenser, and various other system associated hardware including, control valves, but not limited thereto.

Referring to FIG. 2, the present disclosure is directed towards a system 200 for regulating the environment within the cabin 112 of the machine 100 (see FIG. 1) via the HVAC system 126 of the cabin 112. The machine 100 includes the system 200. The system 200 includes a first sensor 204 that generates a first signal S1 indicative of an amount of air pressure within the cabin 112. The first sensor 204 may embody a pressure sensor. The first sensor 204 may include a gauge air pressure sensor, an absolute air pressure sensor, or any other type of pressure sensor known in the art that may operably generate the first signal S1. In an example of an alternative configuration, the first sensor 204, disclosed herein, may embody a combination of multiple sensors disposed at different locations within the cabin 112 for generating the first signal S1.

Further, the system 200 includes a second sensor 206. The second sensor 206 generates a second signal S2 indicative of an amount of carbon dioxide ($CO_2$) within the cabin 112. The second sensor 206 may embody a $CO_2$ sensor. In an example, the second sensor 206 may include a non-dispersive infrared (NDIR) sensor or any other type of $CO_2$ sensor commonly known to persons skilled in the art. In alternative configurations, the second sensor 206 may embody a combination of multiple sensors disposed at different locations within the cabin 112 for generating the second signal S2.

The system 200 further includes an air filtration element 208 to direct pre-cleaned air into the cabin 112. The air filtration element 208 is located upstream of the HVAC system 126. The air filtration element 208 operatively filters ambient air of any contaminants and directs cleaned air (hereinafter referred to as "the pre-cleaned air") towards the HVAC system 126. In an embodiment, the air filtration element 208 may include a high efficiency particulate air (HEPA) filter. However, the air filtration element 208 may include any other type of filter, such as, an efficient air (EPA) filter, or an ultralow penetration air (ULPA) filter.

Further, the system 200 includes an inlet valve 210 disposed between the air filtration element 208 and the HVAC system 126. The inlet valve 210 controls the flowrate of the pre-cleaned air into the cabin 112. Further, the inlet valve 210 is configured, with one or more electronic commands from a controller 212, to operatively control the flowrate of the pre-cleaned air into the cabin 112. Stated differently, the inlet valve 210 may regulate the flowrate of the pre-cleaned air received from the air filtration element 208. The inlet valve 210 may include any type of valve known in the art that may be controlled to vary the flowrate of the pre-cleaned air. The inlet valve 210 may include a globe valve, a butterfly valve, or any other type of electro-mechanically actuated valve as per application requirements. It should be noted that the inlet valve 210 may include multiple hardware that may work in unison to control the flowrate of the pre-cleaned air.

The inlet valve 210 may include a component, such as a flap or a gate, that may be controlled in order to vary an amount of ambient air into, and via an inlet zone (not shown) of, the air filtration element 208. The inlet valve 210 may be operatively disposed in an open position, a closed position, and various intermediate positions ranging between the open and closed positions. Specifically, the position of the inlet valve 210 may be operatively varied to vary the flowrate of the pre-cleaned air into the cabin 112 via the HVAC system 126. More specifically, the position of the inlet valve 210 may be varied to vary the amount of ambient, or unclean, air into, and via, the air filtration element 208. It is hereby contemplated that when the inlet valve 210 is set to a fixed, or desired, position, a resulting backpressure concomitantly develops at the air filtration element 208, and this backpressure at the air filtration element 208 in turn regulates the amount of ambient air that can enter, via the air filtration element 208.

The system 200 further includes the controller 212. The controller 212 may be a proportional integral (PI) controller. The controller 212 is coupled in communication with the first sensor 204, the second sensor 206, and the inlet valve 210. In an example, coupling of the controller 212 with the first sensor 204, the second sensor 206, and the inlet valve 210 may be established by use of one or more electric wires (not shown). Alternatively, the coupling of the controller 212 with the first sensor 204, the second sensor 206, and the inlet valve 210 may be wireless i.e., using any wireless technology including, but not limited to, IoT (internet of things), a wide area network (WAN), a local area network (LAN), an internet, an intranet, a cellular network, a satellite network, Wi-Fi, and/or Bluetooth.

Further, the controller 212 may be embodied as a machine control unit (MCU) that may be present onboard the machine 100. Alternatively, the controller 212 may be embodied as a standalone device separate from the MCU. The controller 212 includes one or more memories 216 (e.g., a non-transitory computer readable medium) and one or more processors 214 communicably coupled with the one or more memories 216. Each memory 216 may include, for example, a flash memory, a random-access memory (RAM), and an electrically erasable programmable read-only memory (EEPROM). The memories 216 may store data, such as, algorithms, instructions, and/or arithmetic operations. The controller 212 may execute various types of digitally stored instructions, such as, a software or an algorithm, retrieved from the memories 216, and/or a firmware program which may enable the controller 212 to perform a wide variety of operations. Although aspects of the present disclosure may be described generally as being stored in the memories 216, it may be contemplated that these aspects may be stored on, and read from, different types of computer program products or computer-readable media such as hard disks, floppy disks, optical media, compact disc-read only memory (CD-ROM), or other forms of RAM or read only memory (ROM).

Moreover, the processors 214 may be any device that executes code and perform logical operations. It should be noted that each processor 214 may embody a single microprocessor or multiple microprocessors for receiving various input signals. Numerous commercially available microprocessors may be configured to perform the functions of the processors 214. Each processor 214 may further include a general processor, a central processing unit, an application specific integrated circuit (ASIC), a digital signal processor, a field programmable gate array (FPGA), a digital circuit, an analog circuit, a controller, a microcontroller, any other type of processor, or any combination thereof. Each processor 214 may include one or more components that may be operable to execute computer executable instructions or computer code that may be stored and retrieved from the memories 216.

It should be noted that, when the machine 100 is powered on, the system 200 may start monitoring and regulating the environment within the cabin 112. The controller 212 receives the first signal S1 indicative of the amount of air pressure within the cabin 112 from the first sensor 204. Further, the controller 212 receives the second signal S2 indicative of the amount of $CO_2$ within the cabin 112 from the second sensor 206. The first sensor 204 and the second sensor 206 operate to measure the amount of air pressure and the amount of $CO_2$, respectively, and return the measured values back to the controller 212. It should be noted that the controller 212 performs real-time monitoring, and regulation of the amount of air pressure and the amount of $CO_2$ within the cabin 112.

The controller 212 compares the amount of air pressure within the cabin 112 with a predefined allowable pressure range R1 upon receipt of the first signal S1. The controller 212 also compares the amount of $CO_2$ within the cabin 112 with a predefined maximum allowable value V1 upon receipt of the second signal S2. The predefined allowable pressure range R1 and the predefined maximum allowable value V1 may be a set of values dictated by one or more regulatory standards and electronically prestored in the memories 216 of the controller 212.

Further, the predefined allowable pressure range R1 may define a minimum allowable pressure value $P_{min}$ and a maximum allowable pressure value $P_{max}$. In an example, the minimum allowable pressure value $P_{min}$ may be at least 20 pascals (Pa) above atmospheric pressure and the maximum allowable pressure value $P_{max}$ may not exceed 200 Pa above atmospheric pressure. It should be noted that the predefined allowable pressure range R1 as provided herein is illustrative in nature and therefore, non-limiting of this disclosure. The predefined allowable pressure range R1 may vary as per current regulatory standards applicable at the worksite where the machine 100 is operating.

Furthermore, the predefined maximum allowable value V1 of $CO_2$ may be based on current regulatory standards applicable at the worksite where the machine 100 is operating as well as a local ambient $CO_2$ reading at the worksite. In an example, the predefined maximum allowable value V1 may be at least 400 parts per million (PPM) more than the local ambient $CO_2$ reading. For example, for a local ambient $CO_2$ reading of 500 PPM, the predefined maximum allowable value may be approximately equal to 900 PPM (i.e., local ambient $CO_2$ reading (500 PPM)+400 PPM). It should be noted that the predefined allowable pressure range R1 and the predefined maximum allowable value V1 may be obtained as per any other criteria/factors not listed herein, without any limitations thereto.

The controller 212 of the system 200 determines that the environment within the cabin 112 requires regulation, from the comparisons, either if the first signal S1 indicative of the amount of air pressure within the cabin 112 being outside of the predefined allowable pressure range R1 or the second signal S2 indicative of the amount of $CO_2$ within the cabin 112 is greater than the predefined maximum allowable value V1. Moreover, if the controller 212 determines that either the amount of air pressure within the cabin 112 is outside of the predefined allowable pressure range R1 or the amount of $CO_2$ within the cabin 112 is greater than the predefined maximum allowable value V1, the controller 212 actuates a dynamic auto-control of the inlet valve 210. Specifically, the controller 212 actuates the dynamic auto-control of the inlet valve 210 to direct an optimally varying flowrate of the pre-cleaned air from the air filtration element 208 to the HVAC system 126 via the inlet valve 210 to maximize a service life of the air filtration element 208, or stated differently, to maximize a remaining, or current, useful life of the air filtration element 208. Specifically, the controller 212 generates and transmits a first output signal O1 to the inlet valve 210 for controlling the position of the inlet valve 210 so that the inlet valve 210 directs the optimally varying flowrate of the pre-cleaned air from the air filtration element 208 to the HVAC system 126. Thus, based on the first output signal O1, the position of the inlet valve 210 is varied in a manner so as to alter a current flowrate of the pre-cleaned air.

It should be noted that the term "optimally varying flowrate" as used herein may relate to a varying flowrate that may be decided based on the predefined allowable pressure range R1 of air pressure and the predefined maximum allowable value V1 of $CO_2$. In other words, the optimally varying flowrate may be decided such that the optimally varying flowrate maintains the amount of air pressure and the amount of $CO_2$ within the cabin 112 within the regulatory standards. In an example, the optimally varying flowrate may be about 20 Pa to about 50 Pa greater than the atmospheric pressure. It should be noted that the optimally varying flowrate may be decided so as to reduce a stress on the air filtration element 208 to ultimately maximize the service life of the air filtration element 208. Further, the optimally varying flowrate may be determined based on research, calculations, and historical data. In an example, the optimally varying flowrate may be determined using one or more simulation software. The optimally varying flowrate may be prestored within the memories 216 of the controller 212.

Thus, the dynamic auto-control of the inlet valve 210 provides an automated feature in which the controller 212 automatically operates the inlet valve 210 to direct the optimally varying flowrate of the pre-cleaned air while still meeting the current regulatory standards for the amount of air pressure and the amount of $CO_2$ within the cabin 112.

Further, the system 200 also allows the operator of the machine 100 to alter or override the dynamic auto-control of the inlet valve 210 by the controller 212. Accordingly, the system 200 includes the input device 120 coupled in communication with the controller 212. The input device 120 facilitates receipt of an input I1 from the operator of the machine 100 for manually overriding the dynamic auto-control of the inlet valve 210 by the controller 212 by facilitating a selection of a preset constant flowrate of the pre-cleaned air corresponding to a desired air pressure range for the cabin 112 from a number of discrete air pressure ranges. In such examples, the flowrate of the pre-cleaned air may be based on the desired air pressure range as per operator comfort. Further, the controller 212 prioritizes the input I1 from the operator over the dynamic auto-control of the inlet valve 210.

Based on the receipt of the input I1 from the operator, the controller 212 generates a second output signal O2 to control the position of the inlet valve 210 such that the preset constant flowrate of the pre-cleaned air is directed from the air filtration element 208 to the HVAC system 126. It should be noted that the input I1 to facilitate the selection of the preset constant flowrate corresponding to the desired air pressure range is based on operator preference.

Further, the term "preset constant flowrate" as used herein corresponds to a flowrate that may correspond to any one of the number of discrete air pressure ranges. In an example, the number of discrete air pressure ranges may include a low air pressure range, an intermediate air pressure range, and a high air pressure range. However, it may be contemplated that the discrete air pressure ranges may include any number of air pressure ranges.

It should be noted that the operator may be able to select any one of the discrete air pressure ranges as the desired air pressure range. The preset constant flowrate may be different for each discrete air pressure range. For example, the preset constant flowrate may correspond to a low constant flowrate when the discrete air pressure range corresponds to the low air pressure range. Further, the present constant flowrate may correspond to an intermediate constant flowrate (that may be higher than the low constant flowrate) when the discrete air pressure range corresponds to the intermediate air pressure range. Moreover, the present constant flowrate may correspond to a high constant flowrate (that may be higher than the low and intermediate constant flowrates) when the discrete air pres sure range corresponds to the high air pressure range. It should be noted that the information corresponding to the discrete air pressure ranges and the preset constant flowrate for corresponding discrete air pressure ranges may be prestored within the memories 216 of the controller 212.

Further, the system 200 includes the display device 122 present within the cabin 112 and coupled in communication with the controller 212. The display device 122 displays the amount of air pressure within the cabin 112 and the amount of $CO_2$ within the cabin 112 thereon. Specifically, the display device 122 receives the amount of air pressure within the cabin 112 and the amount of $CO_2$ within the cabin 112 from the controller 212 and displays the same thereon for apprising the operator regarding the amounts of air pressure and $CO_2$ within the cabin 112 in real-time. The controller 212 is also configured to generate an alert notification if either the amount of air pressure within the cabin 112 is outside of the predefined allowable pressure range R1 or the amount of $CO_2$ within the cabin 112 is greater than the predefined maximum allowable value V1. The display device 122 displays the alert notification thereon. For example, the display device 122 may display a text message or an icon to notify the operator that either the amount of air pressure within the cabin 112 is outside of the predefined allowable pressure range R1 or the amount of $CO_2$ within the cabin 112 is greater than the predefined maximum allowable value V1.

The system 200 also includes the alarm 124 present within the cabin 112 and coupled in communication with the controller 212. The controller 212 activates the alarm 124 based on the generation of the alert notification. Specifically, based on the generation of the alert notification, the controller 212 may transmit a third output signal O3 to the alarm

124. Further, based on the receipt of the third output signal O3, the alarm 124 may be activated to generate an alert tone, a buzzer, a horn, or a voice message to alert the operator that either the amount of air pressure within the cabin 112 is outside of the predefined allowable pressure range R1 or the amount of $CO_2$ within the cabin 112 is greater than the predefined maximum allowable value V1. In an example, the alarm 124 may remain active until the operator deactivates the alarm 124. In some examples, the operator may be able to mute the alarm 124, so that the alarm 124 does not activate based on the generation of the alert notification.

Further, the controller 212 transmits each of the alert notification, the amount of air pressure within the cabin 112, and the amount of $CO_2$ within the cabin 112 to a remotely located back-office computing system 222. The controller 212 may transmit the alert notification, the amount of air pressure within the cabin 112, and the amount of $CO_2$ in a wireless manner. In some examples, based on pre-defined criteria and/or algorithms, the back-office computing system 222 may alert a fleet manager about any undesirable events, such as, when air pressure is outside of the predefined allowable pressure range R1 or the amount of $CO_2$ is greater than the predefined maximum allowable value V1. The back-office computing system 222 may maintain data records of all relevant events.

Further, the system 200 may include a network manager 224. The network manager 224 may be embodied as a communication medium between the controller 212 and the back-office computing system 222. The network manager 224 may also store historical data related to various events of the machine 100. For example, the network manager 224 may store the amounts of air pressure at different time instances, the amounts of $CO_2$ at different time instances, and/or the alert notifications generated by the controller 212. The network manager 224 may transmit all relevant data to the back-office computing system 222, as and when desired, or at regular intervals.

Further, the controller 212 also transmits each of the alert notification, the amount of air pressure within the cabin 112, and the amount of $CO_2$ within the cabin 112 to one or more personnel remotely located relative to the machine 100. The controller 212 may transmit the alert notification, the amount of air pressure within the cabin 112, and the amount of $CO_2$ to a portable device (not shown) present with the personnel in a wireless manner. The portable device may include, for example, a smartphone, a tablet, a laptop, or other electronic device on which the alert notification, the amount of air pressure, and the amount of $CO_2$ may be provided.

Furthermore, each of the alert notification, the amount of air pressure within the cabin 112, and the amount of $CO_2$ within the cabin 112 is used to determine an anomaly with the one or more sealing elements associated with the cabin 112, a remaining useful life of the air filtration element 208, an efficiency of the air filtration element 208, and/or the efficiency of the HVAC system 126. For example, the amounts of air pressure and the amounts of $CO_2$ within the cabin 112 may vary significantly in a very short duration of time owing to wearing out of the sealing elements associated with the cabin 112.

In an example, the remaining useful life of the air filtration element 208 may also be determined based on analysis of frequency of the alert notifications, the amount of air pressure within the cabin 112, and/or the amount of $CO_2$ within the cabin 112. In some examples, the amount of air pressure within the cabin 112 and the amount of $CO_2$ within the cabin 112 may be correlated with the efficiency of the air filtration element 208 and/or the HVAC system 126. For example, a frequent fluctuation in the amount of air pressure within the cabin 112 and the amount of $CO_2$ within the cabin 112 may indicate a problem with the functioning of the air filtration element 208 and/or HVAC system 126.

The system 200 may also include a calibration kit for calibrating the first sensor 204 and the second sensor 206. In an example, the first sensor 204 and the second sensor 206 may be calibrated at regular intervals. In another example, the first sensor 204 and the second sensor 206 may be calibrated after each maintenance or servicing schedule. Further, the display device 122 may present a calibration interface thereon for calibration of the first and second sensors 204, 206. The memories 216 of the controller 212 may also store diagnostics information for troubleshooting purposes. Moreover, the display device 122 may display the diagnostics information for troubleshooting purposes as per receipt of an operator input.

INDUSTRIAL APPLICABILITY

The present disclosure is related to the system 200 for real-time monitoring and regulation of the environment within the cabin 112 of the machine 100. The controller 212 of the system 200 controls the flowrate of the pre-cleaned air being directed towards the cabin 112. Specifically, the controller 212 actuates the dynamic auto-control of the inlet valve 210 to direct the optimally varying flowrate of the pre-cleaned air in order to maximize the service life of the air filtration element 208. Thus, the system 200 teaches control of the inlet valve 210 to vary air pressure within the cabin 112 such that air pressure in the cabin 112 is within prescribed limits set by current regulatory standards.

Further, during the dynamic auto-control of the inlet valve 210, the pre-cleaned air flows through the air filtration element 208 at a lesser flowrate (i.e., the optimally varying flowrate). Thus, the dynamic auto-control of the inlet valve 210 may minimize a stress or loading as well as back pressure on the air filtration element 208 by allowing a passage of the optimally varying flowrate therethrough. In such an example, the air filtration element 208 may deteriorate at a relatively slower rate thereby achieving the maximum service life of the air filtration element 208. Thus, the system 200 may prolong the service life of the air filtration element 208 and may also reduce a frequency of replacement of the air filtration element 208. Accordingly, costs associated with frequent replacement/servicing of the air filtration element 208 may reduce, thereby reducing operational costs of the machine 100. It should be further noted that the optimally varying flowrate is decided such that the amount of air pressure within the cabin 112 is greater than the minimum allowable pressure value $P_{min}$ but lesser than the maximum allowable pressure value $P_{max}$, which is set as per current regulatory standards. Moreover, the optimally varying flowrate is decided such that the amount of $CO_2$ within the cabin 112 is lesser than the predefined maximum allowable value V1 of $CO_2$, which is set as per regulatory standards. Thus, the system 200 ensures compliance with current regulatory standards for air pressure and $CO_2$ levels, as well longevity of the air filtration element 208.

Moreover, the dynamic auto-control of the inlet valve 210 may also increase the efficiency of the air filtration element 208 and the HVAC system 126. The system 200 described herein may also reduce operating and maintenance costs of the HVAC system 126 by modulating air pressure within the cabin 112.

The system 200 further allows operators to maintain the desired air pressure range within the cabin 112 by allowing the selection of the preset constant flowrate of the pre-cleaned air. For example, if the operator wishes to have the intermediate or high air pressure ranges within the cabin 112 instead of the lower air pressure range, the operator may generate the input I1 to override the dynamic auto-control by the controller 212 for maintaining the intermediate or high air pressure ranges within the cabin 112. Overall, the system 200 described herein may improve operator experience and comfort based on active and real time regulation of the environment within the cabin 112, thereby improving a usability of the machine 100.

The system 200 of the present disclosure also provides the alert notifications through the alarm 124 and the display device 122 either when the amount of air pressure within the cabin 112 is outside of the predefined allowable pressure range R1 or when the amount of $CO_2$ within the cabin 112 exceeds the predefined maximum allowable value V1. The alert notifications may inform the operator, personnel, or the back-office computing system 222 regarding any incidents of low amounts of air pressure, high amounts of air pressure, or high amounts of $CO_2$ within the cabin 112. The system 200 also allows transfer of the data related to the amount of air pressure and the amount of $CO_2$ within the cabin 112 to the back-office computing system 222. In some examples, the data related to the amount of air pressure and the amount of $CO_2$ within the cabin 112 may be further used to determine the remaining useful life of the air filtration element 208, any anomalies with the sealing elements of the cabin 112, the efficiency of the air filtration element 208, and/or the efficiency of the HVAC system 126. The system 200 described herein may be retrofitted on existing machines with minimum modifications.

FIG. 3 illustrates a flowchart of a method 300 for regulating the environment within the cabin 112 of the machine 100 via the HVAC system 126 of the cabin 112. At step 302, the controller 212 receives the first signal S1 indicative of the amount of air pressure within the cabin 112. At step 304, the controller 212 receives the second signal S2 indicative of the amount of $CO_2$ within the cabin 112. At step 306, the controller 212 compares each of the amount of air pressure within the cabin 112 with the predefined allowable pressure range R1 upon receipt of the first signal S1 and the amount of $CO_2$ within the cabin 112 with the predefined maximum allowable value V1 upon receipt of the second signal S2. At step 308, the controller 212 determines if the environment within the cabin 112 requires regulation, from the comparisons, if either the amount of air pressure within the cabin 112 is outside of the predefined allowable pressure range R1 or the amount of $CO_2$ within the cabin 112 is greater than the predefined maximum allowable value V1.

At step 310, the controller 212 actuates the dynamic auto-control of the inlet valve 210 to direct the optimally varying flowrate of the pre-cleaned air from the air filtration element 208 to the HVAC system 126 via the inlet valve 210 to maximize the service life of the air filtration element 208. The air filtration element 208 directs the pre-cleaned air into the cabin 112. The inlet valve 210 is disposed between the air filtration element 208 and the HVAC system 126. Further, the air filtration element 208 is the HEPA filter.

The controller 212 also receives the input I1 from the operator of the machine 100 for manually overriding the dynamic auto-control of the inlet valve 210 by the controller 212 by facilitating the selection of the preset constant flowrate of the pre-cleaned air corresponding to the desired air pressure range for the cabin 112 from the number of discrete air pressure ranges. The input I1 is received via the input device 120 present within the cabin 112 and coupled in communication with the controller 212. Further, the input I1 to facilitate the selection of the preset constant flowrate corresponding to the desired air pressure range is based on operator preference.

The controller 212 also generates the alert notification if either the amount of air pressure within the cabin 112 is outside of the predefined allowable pressure range R1 or the amount of $CO_2$ within the cabin 112 is greater than the predefined maximum allowable value V1. Moreover, the controller 212 activates the alarm 124 based on the generation of the alert notification. The alarm 124 is present within the cabin 112 and coupled in communication with the controller 212.

Further, the controller 212 transmits each of the alert notification, the amount of air pressure within the cabin 112, and the amount of $CO_2$ within the cabin 112 to the remotely located back-office computing system 222 and/or one or more personnel remotely located relative to the machine 100. Furthermore, each of the alert notification, the amount of air pressure within the cabin 112, and the amount of $CO_2$ within the cabin 112 is used to determine the anomaly with the one or more sealing elements associated with the cabin 112, the remaining useful life of the air filtration element 208, the efficiency of the air filtration element 208, and/or the efficiency of the HVAC system 126. Moreover, the amount of air pressure within the cabin 112 and the amount of $CO_2$ are displayed within the cabin 112 on the display device 122. The display device 122 is present within the cabin 112 and coupled in communication with the controller 212.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of the disclosure. Such embodiments should be understood to fall within the scope of the present disclosure as determined based upon the claims and any equivalents thereof.

What is claimed is:

1. A system for regulating an environment within an operator cabin of a machine via a heating, ventilation, and air conditioning (HVAC) system of the operator cabin, the system comprising:

a first sensor configured to generate a first signal indicative of an amount of air pressure within the operator cabin;

a second sensor configured to generate a second signal indicative of an amount of carbon dioxide ($CO_2$) within the operator cabin;

an air filtration element configured to direct pre-cleaned air into the operator cabin;

an inlet valve disposed between the air filtration element and the HVAC system, wherein the inlet valve is configured to control a flowrate of the pre-cleaned air to the HVAC system; and a controller coupled in communication with the first sensor, the second sensor, and the inlet valve, wherein the controller is configured to:

receive the first signal indicative of the amount of air pressure within the operator cabin from the first sensor;

receive the second signal indicative of the amount of $CO_2$ within the operator cabin from the second sensor;

compare each of the amount of air pressure within the operator cabin with a predefined allowable pressure range upon receipt of the first signal and the amount of $CO_2$ within the operator cabin with a predefined maximum allowable value upon receipt of the second signal;

determine if the environment within the operator cabin requires regulation, from the comparisons, if at least one of:

the amount of air pressure within the operator cabin is outside of the predefined allowable pressure range, and the amount of $CO_2$ within the operator cabin is greater than the predefined maximum allowable value;

actuate dynamic auto-control of the inlet valve to direct a varying flowrate of the pre-cleaned air from the air filtration element to the HVAC system via the inlet valve to maximize a service life of the air filtration element;

determine, based on the amount of air pressure within the operator cabin and the amount of $CO_2$ within the operator cabin, an anomaly with one or more sealing elements associated with the operator cabin; and generate an alert notification in response to the determined anomaly.

2. The system of claim 1, wherein the alert notification is a first alert notification, and wherein the controller is configured to generate a second alert notification if at least one of:

the amount of air pressure within the operator cabin is outside of the predefined allowable pressure range; and the amount of $CO_2$ within the operator cabin is greater than the predefined maximum allowable value.

3. The system of claim 2 further comprising an alarm present within the operator cabin and coupled in communication with the controller, wherein the controller is configured to activate the alarm based on a generation of the second alert notification.

4. The system of claim 2, wherein the controller is configured to transmit each of the second alert notification, the amount of air pressure within the operator cabin, and the amount of $CO_2$ within the operator cabin to a remotely located back-office computing system.

5. The system of claim 2, wherein the controller is configured to transmit each of the second alert notification, the amount of air pressure within the operator cabin, and the amount of $CO_2$ within the operator cabin to one or more personnel remotely located relative to the machine.

6. The system of claim 2, wherein the amount of air pressure within the operator cabin and the amount of $CO_2$ within the operator cabin are further used to determine at least one of:

a remaining useful life of the air filtration element;

an efficiency of the air filtration element; and the efficiency of the HVAC system.

7. The system of claim 2 further comprising a display device present within the operator cabin and coupled in communication with the controller, the display device configured to display the amount of air pressure within the operator cabin and the amount of $CO_2$ within the operator cabin thereon.

8. The system of claim 1 further comprising an input device coupled in communication with the controller, the input device configured to facilitate receipt of an input from an operator of the machine for manually overriding the dynamic auto-control of the inlet valve by the controller by facilitating a selection of a preset constant flowrate of the pre-cleaned air corresponding to a desired air pressure range for the operator cabin from a plurality of discrete air pressure ranges.

9. The system of claim 8, wherein the input to facilitate the selection of the preset constant flowrate corresponding to the desired air pressure range is based on operator preference.

10. The system of claim 1, wherein the air filtration element is a high efficiency particulate air (HEPA) filter.

11. A machine comprising:
an operator cabin;
a heating, ventilation, and air conditioning (HVAC) system associated with the operator cabin; and
the system of claim 1 for regulating the environment within the operator cabin via the HVAC system.

12. A method for regulating an environment within an operator cabin of a machine via a heating, ventilation, and air conditioning (HVAC) system of the operator cabin, the method comprising:
receiving, by a controller, a first signal indicative of an amount of air pressure within the operator cabin;
receiving, by the controller, a second signal indicative of an amount of carbon dioxide ($CO_2$) within the operator cabin;
comparing, by the controller, each of the amount of air pressure within the operator cabin with a predefined allowable pressure range upon receipt of the first signal and the amount of $CO_2$ within the operator cabin with a predefined maximum allowable value upon receipt of the second signal;
determining, by the controller, if the environment within the operator cabin requires regulation, from the comparisons, if at least one of the amount of air pressure within the operator cabin is outside of the predefined allowable pressure range and the amount of $CO_2$ within the operator cabin is greater than the predefined maximum allowable value; and
actuating, by the controller, dynamic auto-control of an inlet valve to direct a varying flowrate of pre-cleaned air from an air filtration element to the HVAC system via the inlet valve to maximize a service life of the air filtration element, wherein the air filtration element is configured to direct the pre-cleaned air into the operator cabin, and wherein the inlet valve is disposed between the air filtration element and the HVAC system;
determining, by the controller and based on the amount of air pressure within the operator cabin and the amount of $CO_2$ within the operator cabin, an anomaly with one or more sealing elements associated with the operator cabin; and generating, by the controller, an alert notification in response to the determined anomaly.

13. The method of claim 12, wherein the alert notification is a first alert notification, and the method of claim 12 further comprising generating, by the controller, a second alert notification if at least one of:
the amount of air pressure within the operator cabin is outside of the predefined allowable pressure range; and
the amount of $CO_2$ within the operator cabin is greater than the predefined maximum allowable value.

14. The method of claim 13 further comprising activating, by the controller, an alarm based on a generation of the second alert notification, wherein the alarm is present within the operator cabin and coupled in communication with the controller.

15. The method of claim 13 further comprising transmitting, by the controller, each of the second alert notification, the amount of air pressure within the operator cabin, and the amount of $CO_2$ within the operator cabin to at least one of a remotely located back-office computing system and one or more personnel remotely located relative to the machine.

16. The method of claim 13, wherein the amount of air pressure within the operator cabin and the amount of $CO_2$ within the operator cabin are further used to determine at least one of:
a remaining useful life of the air filtration element;
an efficiency of the air filtration element; and
the efficiency of the HVAC system.

17. The method of claim 12 further comprising displaying the amount of air pressure within the operator cabin and the amount of $CO_2$ within the operator cabin on a display device, wherein the display device is present within the operator cabin and coupled in communication with the controller.

18. The method of claim 12 further comprising receiving, by the controller, an input from an operator of the machine for manually overriding the dynamic auto-control of the inlet valve by the controller by facilitating a selection of a preset constant flowrate of the pre-cleaned air corresponding to a desired air pressure range for the operator cabin from a plurality of discrete air pressure ranges, wherein the input is received via an input device present within the operator cabin and coupled in communication with the controller.

19. The method of claim 18, wherein the input to facilitate the selection of the preset constant flowrate corresponding to the desired air pressure range is based on operator preference.

20. The method of claim 12, wherein the air filtration element is a high efficiency particulate air (HEPA) filter.

* * * * *